(12) United States Patent
Toyama et al.

(10) Patent No.: US 12,397,370 B2
(45) Date of Patent: Aug. 26, 2025

(54) PULSE DURATION MEASURING APPARATUS

(71) Applicant: DISCO CORPORATION, Tokyo (JP)

(72) Inventors: Koji Toyama, Tokyo (JP); Nobuyuki Kimura, Tokyo (JP); Koichi Katayama, Tokyo (JP); Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 686 days.

(21) Appl. No.: 17/817,389

(22) Filed: Aug. 4, 2022

(65) Prior Publication Data

US 2023/0054345 A1 Feb. 23, 2023

(30) Foreign Application Priority Data

Aug. 19, 2021 (JP) ................................. 2021-133760

(51) Int. Cl.
*B23K 26/067* (2006.01)
*B23K 26/06* (2014.01)
*B23K 26/0622* (2014.01)

(52) U.S. Cl.
CPC ........ *B23K 26/067* (2013.01); *B23K 26/0622* (2015.10); *B23K 26/0643* (2013.01)

(58) Field of Classification Search
CPC .............. B23K 26/067; B23K 26/0673; B23K 26/062; B23K 26/0622; B23K 26/0624; B23K 26/04; B23K 26/042; B23K 26/043
See application file for complete search history.

(56) References Cited

U.S. PATENT DOCUMENTS 7,459,655 B2 * 12/2008 Nomaru ............. B23K 26/0853
219/121.74
10,072,971 B2 * 9/2018 Dane .................. B23K 26/0732
(Continued)

FOREIGN PATENT DOCUMENTS

JP 2012002604 A 1/2012

OTHER PUBLICATIONS

Junbao Chen et al.; Characteristic measurement for femtosecond laser pulses using a GaAs PIN photodiode as a two-photon photovoltaic receiver; Journal of Applied Physics 121, 223103; Jun. 9, 2017; https://doi.org/10.1063/1.4985244.
(Continued)

*Primary Examiner* — Thuyhang N Nguyen
(74) *Attorney, Agent, or Firm* — Greer Burns & Crain Ltd.

(57) ABSTRACT

A pulse duration measuring apparatus includes a polarizing beam splitter for splitting a pulsed laser beam into a first laser beam and a second laser beam, a first mirror for reflecting the first laser beam traveling toward the polarizing beam splitter, a second mirror for reflecting the second laser beam traveling toward the polarizing beam splitter, a first quarter wavelength plate disposed between the polarizing beam splitter and the first mirror, a second quarter wavelength plate disposed between the polarizing beam splitter and the second mirror, an optical path length changing unit for moving the first mirror or the second mirror to change the length of the respective optical paths, a nonlinear crystal body for allowing a combined laser beam to pass therethrough, and a photodetector for measuring an optical intensity of the combined laser beam that has passed through the nonlinear crystal body.

1 Claim, 3 Drawing Sheets

(56) References Cited

U.S. PATENT DOCUMENTS

| | | | | |
|---|---|---|---|---|
| 12,209,860 B2* | 1/2025 | Herink | ............... | G01B 9/02084 |
| 2003/0227614 A1* | 12/2003 | Taminiau | ............... | G01B 11/00 |
| | | | | 356/125 |
| 2006/0289410 A1* | 12/2006 | Morita | ............... | B23K 26/0617 |
| | | | | 219/121.75 |

OTHER PUBLICATIONS

Office Action issued in counterpart German patent application No. 10 2022 208 350.4, dated Dec. 18, 2024.

* cited by examiner

PULSE DURATION MEASURING APPARATUS

BACKGROUND OF THE INVENTION

Field of the Invention

The present invention relates to a pulse duration measuring apparatus having a plurality of optical parts for measuring pulse duration of a pulsed laser beam.

Description of the Related Art

Wafers with a plurality of devices such as integrated circuits (ICs) and large-scale integration (LSI) circuits formed in respective areas demarcated on their face side by a plurality of intersecting projected dicing lines are divided along the projected dicing lines into individual device chips by a laser processing apparatus. The device chips will be used in various electric appliances such as mobile phones and personal computers.

The laser processing apparatus includes a chuck table for holding a wafer thereon, a laser beam applying unit for applying a pulsed laser beam to the wafer held on the chuck table, and a moving mechanism for moving the chuck table and the laser beam applying unit relatively to each other in X-axis directions indicated by an arrow X and Y-axis directions indicated by an arrow Y. The laser beam applying unit includes a laser oscillator for emitting the pulsed laser beam, a beam condenser for converging the laser beam emitted by the laser oscillator onto the wafer held on the chuck table, and an optical system disposed between the laser oscillator and the beam condenser (see, for example, JP 2012-002604A).

SUMMARY OF THE INVENTION

In the laser processing apparatus described above, the optical system of the laser beam applying unit is serviced for maintenance periodically or as desired in order to keep a required level of processing quality based on the pulsed laser beam. The various maintenance processes that are performed include an inspecting process for measuring the pulse duration of the pulsed laser beam emitted by the laser oscillator and checking whether the measured pulse duration is a desired pulse duration or not.

The inspecting process for measuring the pulse duration of the pulsed laser beam is carried out by a pulse duration measuring apparatus that is relatively large in size. The pulse duration measuring apparatus operates as follows. First, the pulse duration measuring apparatus is positioned in the vicinity of the laser processing apparatus to be serviced for maintenance. Then, separate beam branching means is used to branch a laser beam from the pulsed laser beam emitted from the laser beam applying unit of the laser processing apparatus. The branched laser beam is guided to the pulse duration measuring apparatus that measures the pulse duration of the branched laser beam. The pulse duration measuring apparatus is tedious and time-consuming to use because it is troublesome to install and adjust the pulse duration measuring apparatus before it is actually able to make measurements.

It is therefore an object of the present invention to provide a pulse duration measuring apparatus that is capable of efficiently measuring a pulse duration without branching a laser beam from a pulsed laser beam out of a laser processing apparatus.

In accordance with an aspect of the present invention, there is provided a pulse duration measuring apparatus having a plurality of optical parts for measuring pulse duration of a pulsed laser beam. The pulse duration measuring apparatus includes a laser beam entry element for receiving a pulsed laser beam, a polarizing beam splitter for splitting the pulsed laser beam from the laser beam entry element into a first laser beam traveling along a first optical path and a second laser beam traveling along a second optical path, a first mirror for reflecting the first laser beam traveling along the first optical path toward the polarizing beam splitter, a second mirror for reflecting the second laser beam traveling along the second optical path toward the polarizing beam splitter, a first quarter wavelength plate disposed between the polarizing beam splitter and the first mirror, a second quarter wavelength plate disposed between the polarizing beam splitter and the second mirror, an optical path length changing unit for moving the first mirror or the second mirror along the optical path of the first laser beam or the second laser beam to change a length of the optical path, a nonlinear crystal body for allowing a combined laser beam to pass therethrough, the combined laser beam including respective returning laser beams of the first and second laser beams reflected respectively by the first and second mirrors and combined by the polarizing beam splitter, and a photodetector for measuring an optical intensity of the combined laser beam that has passed through the nonlinear crystal body. The laser beam entry element, the polarizing beam splitter, the first mirror, the second mirror, the first quarter wavelength plate, the second quarter wavelength plate, the optical path length changing unit, the nonlinear crystal body, and the photodetector are disposed on a planar surface.

In the pulse duration measuring apparatus according to the present invention, since the components from the laser beam entry element to the photodetector are disposed on a planar surface, the pulse duration measuring apparatus that is of a planar configuration can measure a pulse duration while being placed on a chuck table of a laser processing apparatus. The pulse duration measuring apparatus according to the present invention eliminates the problems of the conventional pulse duration measuring apparatus in that it is tedious and time-consuming to use as the pulse duration of a pulsed laser beam has to be measured by branching a laser beam from the pulsed laser beam emitted from the optical system of the laser beam applying unit.

The above and other objects, features and advantages of the present invention and the manner of realizing them will become more apparent, and the invention itself will best be understood from a study of the following description and an appended claim with reference to the attached drawings showing a preferred embodiment of the invention.

DETAILED DESCRIPTION OF THE PREFERRED EMBODIMENT

A pulse duration measuring apparatus according to a preferred embodiment of the present invention will be described hereinbelow with reference to the accompanying drawings.

Figure 1:
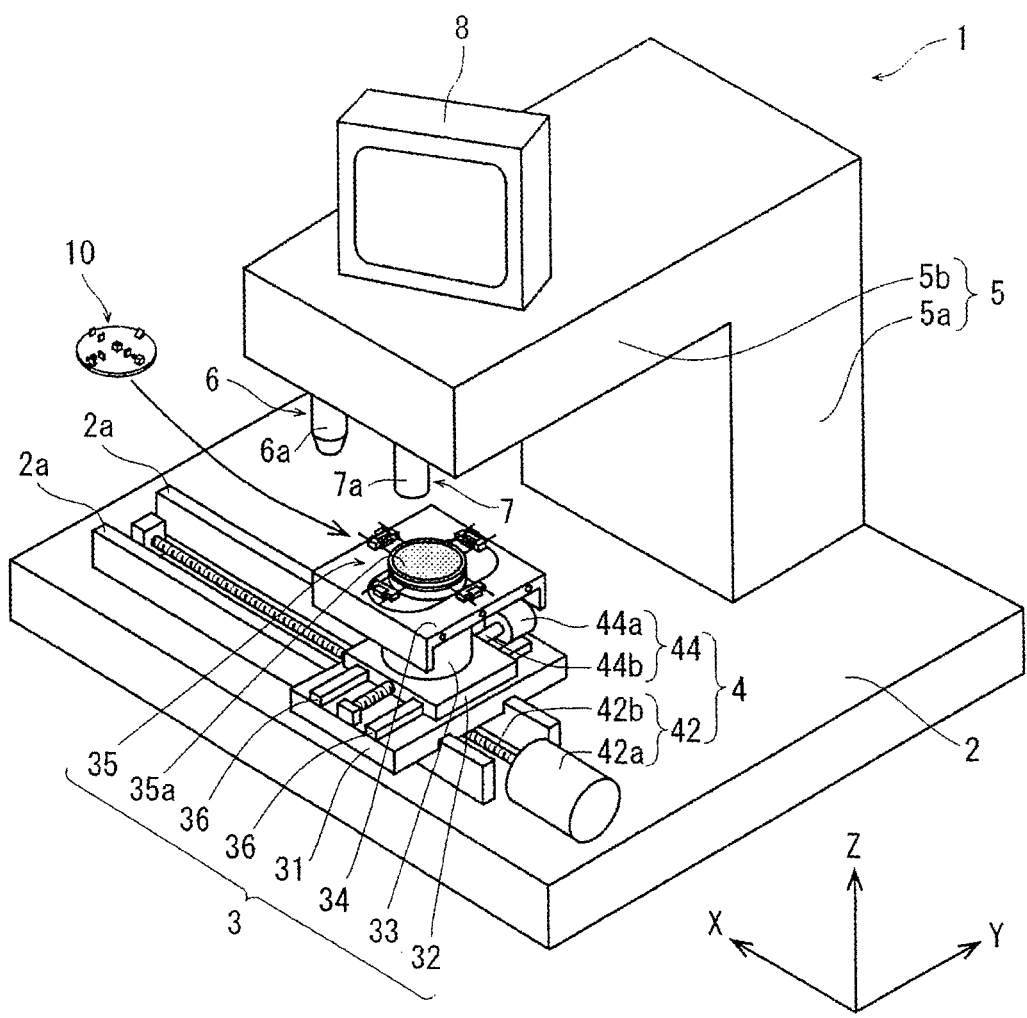
FIG. 1 is a perspective view of a pulse duration measuring apparatus according to an embodiment of the present invention and a laser processing apparatus.

FIG. 1 illustrates in perspective the pulse duration measuring apparatus, denoted by 10, according to the present embodiment and a laser processing apparatus 1 where the pulse duration of a pulsed laser beam can be measured by the pulse duration measuring apparatus 10.

As illustrated in FIG. 1, the laser processing apparatus 1 includes a holding unit 3 that is disposed on a base 2 and that holds a plate-shaped workpiece thereon, a laser beam applying unit 6 for applying a pulsed laser beam to the plate-shaped workpiece on the holding unit 3, alignment means 7 having a camera 7a for capturing an image of the workpiece on the holding unit 3, a moving assembly 4 for processing-feeding the laser beam applying unit 6 and the holding unit 3 relatively to each other and moving the alignment means 7 and the holding unit 3 relatively to each other, and a frame 5 including a vertical wall 5a erected on the base 2 behind the moving assembly 4 and a horizontal wall 5b extending horizontally from an upper end portion of the vertical wall 5a in overhanging relation to the holding unit 3.

The holding unit 3 includes a rectangular X-axis movable plate 31 movably mounted on the base 2 for movement in the X-axis directions, a rectangular Y-axis movable plate 32 movably mounted on the X-axis movable plate 31 for movement in the Y-axis directions that are perpendicular to the X-axis directions, a hollow cylindrical support post 33 fixedly mounted on an upper surface of the Y-axis movable plate 32, and a rectangular cover plate 34 fixedly mounted on an upper end of the support post 33. A chuck table 35 is disposed in the cover plate 34 and extends upwardly through an oblong hole defined in the cover plate 34. The chuck table 35 is rotatable about its vertical central axis by rotary actuating means, not illustrated, housed in the support post 33. The chuck table 35 has a circular suction chuck 35a that is made of an air-permeable porous material and that lies substantially horizontally. The suction chuck 35a is fluidly connected to suction means, not illustrated, through a fluid channel extending through the support post 33.

The moving assembly 4 includes an X-axis feeding mechanism 42 and a Y-axis feeding mechanism 44. The X-axis feeding mechanism 42 converts rotary motion of an electric motor 42a into linear motion with a ball screw 42b and transmits the linear motion to the X-axis movable plate 31, moving the X-axis movable plate 31 in one of the X-axis directions or the other along a pair of guide rails 2a that are disposed on the base 2 and that extend in the X-axis directions. The Y-axis feeding mechanism 44 converts rotary motion of an electric motor 44a into linear motion with a ball screw 44b and transmits the linear motion to the Y-axis movable plate 32, moving the Y-axis movable plate 32 in one of the Y-axis directions or the other along a pair of guide rails 36 that are disposed on the X-axis movable plate 31 and that extend in the Y-axis directions.

The horizontal wall 5b of the frame 5 houses therein an optical system, not illustrated, of the laser beam applying unit 6. The laser beam applying unit 6 includes a beam condenser 6a disposed on the lower surface of a distal end portion of the horizontal wall 5b. The camera 7a of the alignment means 7 is disposed on the lower surface of the distal end portion of the horizontal wall 5b at a position adjacent to the beam condenser 6a in one of the X-axis directions. The camera 7a includes an ordinary image capturing device, such as a charge coupled device (CCD), for capturing images with visible light, infrared ray applying means for applying infrared rays to a workpiece, an optical system for catching infrared rays emitted from the infrared ray applying means, and an image capturing device, such as an infrared CCD, for outputting an electric signal representing the infrared rays caught by the optical system.

The laser processing apparatus 1 includes a control unit, not illustrated. The control unit includes a computer and controls the moving assembly 4, the laser beam applying unit 6, and the alignment means 7, which are electrically connected to the control unit. Display means 8 is disposed on an upper surface of the horizontal wall 5b and electrically connected to the control unit. The control unit controls the display means 8 to display processing conditions and images captured by the camera 7a of the alignment means 7.

The optical system, not illustrated, of the laser beam applying unit 6 includes a laser oscillator for emitting a pulsed laser beam having a predetermined pulse duration. When the laser processing apparatus 1 is serviced for maintenance periodically or as desired, the pulse duration measuring apparatus 10 measures the pulse duration of the pulsed laser beam emitted from the laser oscillator, and checks whether the measured pulse duration is a desired pulse duration or not.

Figure 2:
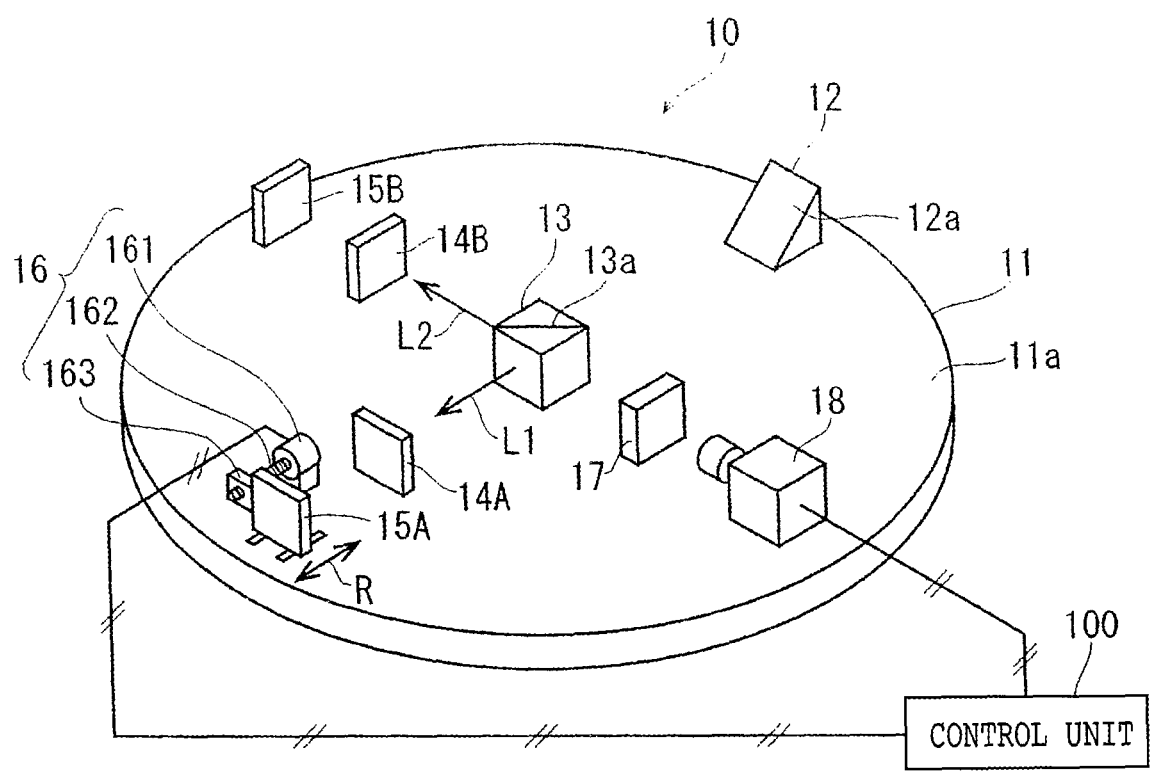
FIG. 2 is an enlarged perspective view of the pulse duration measuring apparatus illustrated in FIG. 1.

FIG. 2 illustrates in enlarged perspective the pulse duration measuring apparatus 10 illustrated in FIG. 1. As illustrated in FIG. 2, the pulse duration measuring apparatus 10 includes a circular base plate 11 having a flat lower surface. The pulse duration measuring apparatus 10 also includes, on a planer upper surface 11a of the base plate 11, a laser beam entry element or a rectangular prism 12 to which a pulsed laser beam is applied vertically from above, a polarizing beam splitter 13, disposed centrally on the planar upper surface 11a, for splitting the pulsed laser beam reflected from a reflecting surface 12a of the laser beam entry element 12 into a first laser beam traveling along a first optical path L1 and a second laser beam traveling along a second optical path L2, with an inner reflecting surface 13a including a multilayer coating, a first mirror 15A for reflecting the first laser beam that has traveled along the first optical path L1 from the polarizing beam splitter 13 back toward the polarizing beam splitter 13, a second mirror 15B for reflecting the second laser beam that has traveled along the second optical path L2 from the polarizing beam splitter 13 back toward the polarizing beam splitter 13, a first quarter wavelength plate 14A disposed between the polarizing beam splitter 13 and the first mirror 15A, and a second quarter wavelength plate 14B disposed between the polarizing beam splitter 13 and the second mirror 15B.

The pulse duration measuring apparatus 10 further includes an optical path length changing unit 16 for moving the first mirror 15A along the optical path L1 of the first laser beam to change the length of the optical path L1, a nonlinear crystal body 17 for allowing a combined laser beam to pass therethrough, the combined laser beam including respective returning laser beams of the first and second laser beams reflected respectively by the first and second mirrors 15A and 15B and combined by the polarizing beam splitter 13, and a photodetector 18 for measuring the optical intensity of the combined laser beam that has passed through the nonlinear crystal body 17. According to the present embodiment, the first optical path L1 starts from the reflecting surface 13a of the polarizing beam splitter 13 and returns from the first mirror 15A back to the reflecting surface 13a of the polarizing beam splitter 13, and the second optical path L2 starts from the reflecting surface 13a of the polarizing beam splitter 13 and returns from the second mirror 15B back to the reflecting surface 13a of the polarizing beam splitter 13.

The laser beam entry element 12 has the reflecting surface 12a that is inclined at an angle of 45° to the optical path of the pulsed laser beam applied vertically from above. The reflecting surface 12a reflects the pulsed laser beam applied vertically from above to travel horizontally, thereby changing the optical path of the pulsed laser beam toward the polarizing beam splitter 13 disposed centrally on the flat upper surface 11a of the circular base plate 11.

The optical path length changing unit 16 includes a stepping motor 161, an externally threaded screw 162 having an end coupled to an output shaft of the stepping motor 161, and a nut 163 having an internally threaded hole operatively threaded over the externally threaded screw 162. The nut 163 is integrally coupled with the first mirror 15A. When the stepping motor 161 is energized, it rotates the externally threaded screw 162 about its central axis, moving the first mirror 15A in one of the directions indicated by an arrow R, i.e., along the first optical path L1.

The stepping motor 161 and the photodetector 18 are electrically connected to a control unit 100. The control unit 100 can store the optical intensity of the combined laser beam, the optical intensity being detected by the photodetector 18, as an electric signal and can also control the stepping motor 161. The control unit 100 sends an operation signal to the stepping motor 161 to move the first mirror 15A accurately along the pulsed first laser beam traveling along the first optical path L1 in one of the directions indicated by the arrow R. The control unit 100 may not necessarily be included in the pulse duration measuring apparatus 10, but the stepping motor 161 and the photodetector 18 may be electrically connected to the control unit, not illustrated, of the laser processing apparatus 1, so that the control unit of the laser processing apparatus 1 can be used to control the pulse duration measuring apparatus 10 to measure the pulse duration of the pulsed laser beam.

Operation and advantages of the pulse duration measuring apparatus 10 as applied to the laser processing apparatus 1 will be described below with reference to FIG. 3 as well as FIGS. 1 and 2.

The circular base plate 11 of the pulse duration measuring apparatus 10 is set to dimensions that can be held under suction on the chuck table 35 of the laser processing apparatus 1. For example, the circular base plate 11 is set to a size commensurate with the suction chuck 35a or larger dimensions.

For measuring the pulse duration, the pulse duration measuring apparatus 10 is placed on the suction chuck 35a of the chuck table 35, and the suction means, not illustrated, is actuated to generate a negative pressure that is transmitted to the suction chuck 35a to hold the workpiece under suction thereon. Then, the moving assembly 4 is actuated to move the chuck table 35 and hence the pulse duration measuring apparatus 10 to a position directly below the camera 7a of the alignment means 7. Then, the camera 7a is energized to capture an image of the pulse duration measuring apparatus 10 to thereby detect the position of the center of the reflecting surface 12a of the laser beam entry element 12 disposed on the flat upper surface 11a of the circular base plate 11.

After the alignment means 7 has detected the position of the center of the reflecting surface 12a of the laser beam entry element 12, the moving assembly 4 is actuated to move the pulse duration measuring apparatus 10 until the center of the reflecting surface 12a of the laser beam entry element 12 is positioned directly below the beam condenser 6a of the laser beam applying unit 6. Then, the laser beam applying unit 6 is energized to emit a pulsed laser beam LB0 (see FIG. 3) from the beam condenser 6a. The pulsed laser beam LB0 has a wavelength of 355 nm, for example, and an average output power level low enough not to process or damage the optical components of the pulse duration measuring apparatus 10.

Figure 3:
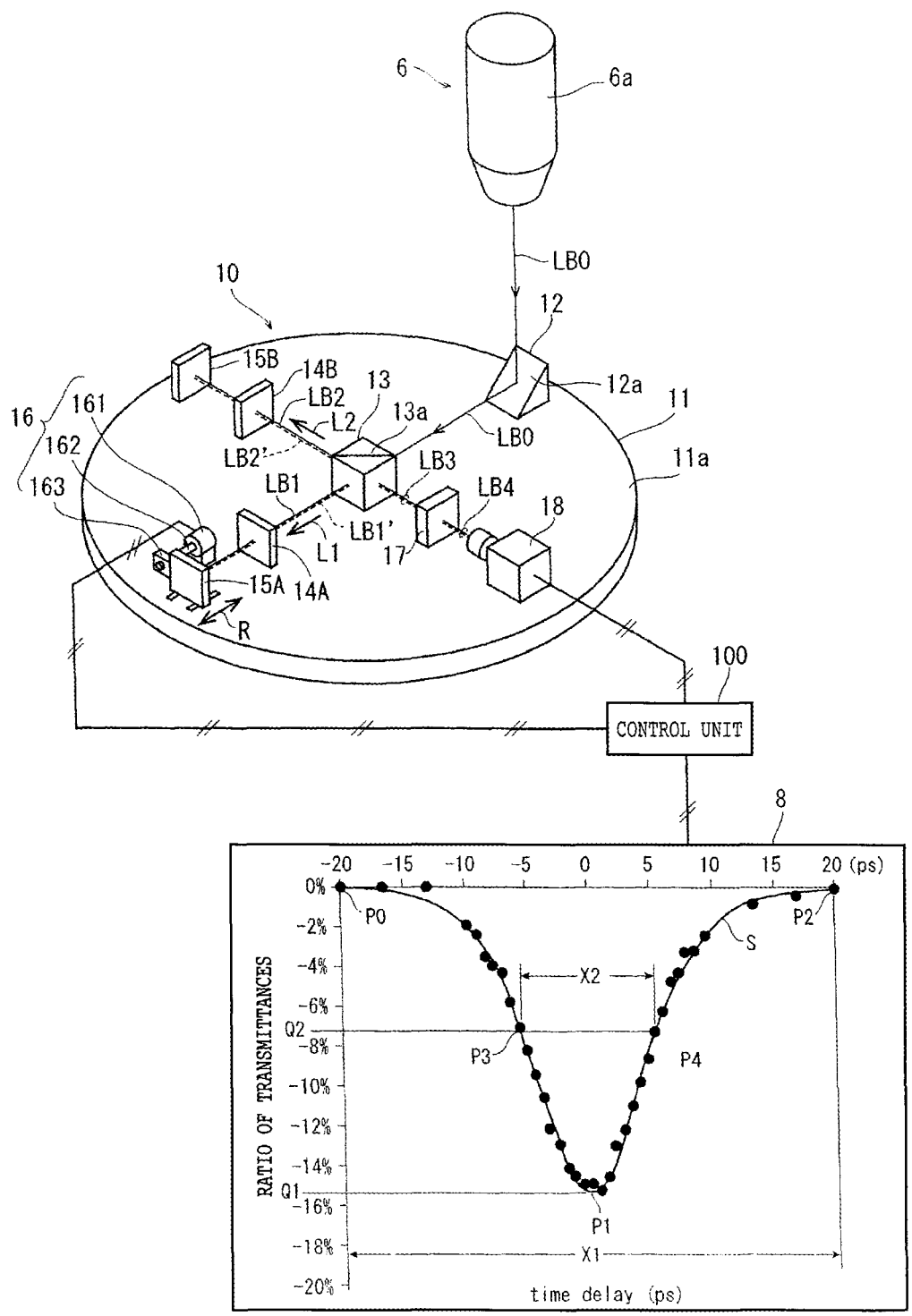
FIG. 3 is a is an enlarged perspective view illustrating the manner in which the pulse duration measuring apparatus illustrated in FIG. 2 is used to measure a pulse duration.

As illustrated in FIG. 3, the pulsed laser beam LB0 emitted from the beam condenser 6a is reflected by the reflecting surface 12a of the laser beam entry element 12 and applied to the polarizing beam splitter 13. The reflecting surface 13a of the polarizing beam splitter 13 transmits therethrough the P-polarized light of the pulsed laser beam LB0 from the laser beam entry element 12 as a first laser beam LB1 traveling along the first optical path L1, and reflects the S-polarized light of the pulsed laser beam LB0 as a second laser beam LB2 traveling along the second optical path L2, so that the P-polarized light and the S-polarized light are branched as the first laser beam LB1 and the second laser beam LB2 from the pulsed laser beam LB0.

The P-polarized first laser beam LB1 that has passed through the reflecting surface 13a of the polarizing beam splitter 13 is converted into a circularly polarized laser beam when it is transmitted through the first quarter wavelength plate 14A disposed between the polarizing beam splitter 13 and the first mirror 15A, and is then reflected by the first mirror 15A. When the first laser beam LB1 is reflected by the first mirror 15A, the direction of rotation of the circularly polarized laser beam is converted into an opposite direction, and when the first laser beam LB1 passes through the first quarter wavelength plate 14A, it is converted into an S-polarized laser beam. The S-polarized laser beam is then applied as a returning laser beam LB1' of the first laser beam LB1 to the polarizing beam splitter 13 and reflected by the reflecting surface 13a thereof to travel toward the photodetector 18, whereupon the returning laser beam LB1' is applied to the nonlinear crystal body 17.

The S-polarized second laser beam LB2 that has been reflected by the reflecting surface 13a of the polarizing beam splitter 13 is converted into a circularly polarized laser beam when it is transmitted through the second quarter wavelength plate 14B disposed between the polarizing beam splitter 13 and the second mirror 15B, and is then reflected by the second mirror 15B. When the second laser beam LB2 is reflected by the second mirror 15B, the direction of rotation of the circularly polarized laser beam is converted into an opposite direction, and when the second laser beam LB2 passes through the second quarter wavelength plate 14B, it is converted into a P-polarized laser beam. The P-polarized laser beam is then applied as a returning laser beam LB2' of the second laser beam LB2 to the polarizing beam splitter 13 and reflected by the reflecting surface 13a thereof to travel toward the photodetector 18, whereupon the returning laser beam LB2' is applied to the nonlinear crystal body 17.

As described above, the pulsed laser beam applied to the nonlinear crystal body 17 is a combined laser beam LB3 that includes the returning first laser beam LB1' and the returning second laser beam LB2' that are combined by the polarizing beam splitter 13. The combined laser beam LB3 includes the P-polarized laser beam and the S-polarized laser beam. According to the present embodiment, the nonlinear crystal body 17 is arranged such that the ratio of transmittances at which the P-polarized laser beam and the S-polarized laser beam of the combined laser beam LB3 are transmitted through the nonlinear crystal body 17 varies depending on the ratio at which the waveforms of the P-polarized laser beam and the S-polarized laser beam overlap each other, thereby changing the optical intensity of a combined laser beam LB4 that is emitted from the nonlinear crystal body 17.

The control unit 100 according to the present embodiment energizes the stepping motor 161 of the optical path length changing unit 16 to move the first mirror 15A along the pulsed first laser beam traveling along the first optical path L1, thereby changing the length of the first optical path L1 for the returning laser beam LB1' that is reflected by the first mirror 15A and that returns to the polarizing beam splitter 13, and controls the photodetector 18 to detect a change in the optical intensity of the returning laser beam LB1'. The changes in the length of the first optical path L1 correspond to double the distance that the first mirror 15A moves therealong.

FIG. 3 illustrates in a lower section a graph representing how the ratio of transmittances at which the P-polarized laser beam and the S-polarized laser beam of the combined laser beam LB3 are transmitted through the nonlinear crystal body 17 varies, as plotted on the basis of the optical intensity detected by the photodetector 18. The graph has a vertical axis representing the ratio of transmittances and a horizontal axis representing time, i.e., picoseconds (ps), corresponding to the changes in the length of the first optical path L1, obtained by dividing the changes in the length of the first optical path L1 by the speed of light. The graph also illustrates an approximate curve S based on the plotted ratio values.

A point represented by P0 in the graph is a point where the optical intensity detected by the photodetector 18 is maximum and the waveforms of the P-polarized laser beam and the S-polarized laser beam of the combined laser beam LB3 do not overlap each other at all. The optical intensity detected at the point P0 is regarded as a reference (0%) for the ratio of transmittances at which the P-polarized laser beam and the S-polarized laser beam of the combined laser beam LB3 are transmitted through the nonlinear crystal body 17. In other words, the optical path length changing unit 16 is operated to make the length of the first optical path L1 smaller than the length of the second optical path L2. As the first mirror 15A is moved by the optical path length changing unit 16 to increase the length of the optical path, the waveforms of the P-polarized laser beam and the S-polarized laser beam of the combined laser beam LB3 start overlapping each other. As the ratio of overlapping increases, the optical intensity of the combined laser beam LB4 emitted from the nonlinear crystal body 17 when the combined laser beam LB3 passes through the nonlinear crystal body 17 decreases.

A minimum point P1 of the approximate curve S in the graph illustrated in the lower section of FIG. 3 is a point where the waveforms of the P-polarized laser beam and the S-polarized laser beam of the combined laser beam LB3 fully overlap each other, i.e., a point where the length of the first optical path L1 and the length of the second optical path L2 coincide with each other, and the optical intensity of the combined laser beam LB4 emitted from the nonlinear crystal body 17 when the combined laser beam LB3 passes through the nonlinear crystal body 17 is lowest. As the first mirror 15A is moved by the optical path length changing unit 16 to increase the length of the optical path, the ratio of overlapping between the waveforms of the P-polarized laser beam and the S-polarized laser beam of the combined laser beam LB3 is lowered, and the optical intensity of the combined laser beam LB4, the optical intensity being detected by the photodetector 18, increases. When the waveforms of the P-polarized laser beam and the S-polarized laser beam of the combined laser beam LB3 finish overlapping each other, the detected optical intensity becomes maximum at a point P2 where the ratio of transmittances is of the same value as the ratio of transmittances at the point PG. A waveform thus derived that is represented by the approximate curve S is highly correlated to the pulsed waveform of the pulsed laser beam LB0. The pulse duration of the pulsed laser beam LB0 is calculated from the approximate curve S according to the following calculating procedure.

According to the embodiment described above, a change X1 in the length of the first optical path L1 from the point P0 to the point P2 of the approximate curve S is 12000 μm, for example. Dividing 12000 μm by the speed of light (300 μm) per picosecond (ps) results in 40 ps. From the distribution of the ratios of transmittances corresponding to the change X1=12000 μm illustrated in the graph in FIG. 3, a change X2 in the length of the first optical path L1 corresponding to the pulse duration, denoted by W, is calculated as a change in the optical path length between points P3 and P4 at a ratio Q2 of transmittances that is 1/2 of a ratio Q1 of transmittances at the minimum point P1 of the approximate curve S. The change X2 detected according to the present embodiment is 3180 μm, and the pulse duration W measured according to the present embodiment is specified with respect to a value obtained by dividing the change X2 by the speed of light, i.e., 300 μm/ps, as a reference. More specifically, 3180 μm÷300 μm/ps=10.6 ps is calculated as a reference, and 10.6 ps is divided by $2^{1/2}$ (≈1.41) that represents a parameter on the assumption that the pulsed waveform of the pulsed laser beam LB0 is a Gaussian waveform. The value (=7.5 ps) thus obtained by the division is determined to be the pulse duration W as a measured value, which is stored in the control unit 100. It is then determined whether the measured pulse duration W is a desired pulse duration or not. If the measured pulse duration W is not a desired pulse duration, then the laser oscillator that emits the pulsed laser beam LB0 is adjusted or replaced.

The above process of measuring the pulse duration is by way of example only, and various other processes of calculating pulse durations are known in the art. Therefore, an actual process of determining a pulse duration using the pulse duration measuring apparatus 10 is not limited to the process according to the above embodiment.

According to the above embodiment, the pulse duration measuring apparatus 10 that is of a planar configuration can measure a pulse duration while being placed on the chuck table of the laser processing apparatus. The pulse duration measuring apparatus 10 eliminates the problems of the conventional pulse duration measuring apparatus in that it is tedious and time-consuming to use as the pulse duration of a pulsed laser beam has to be measured by branching a laser beam from the pulsed laser beam emitted from the optical system of the laser beam applying unit.

According to the above embodiment, the optical path length changing unit 16 is provided as means for moving the first mirror 15A along the optical path. However, it may be provided as means for moving the second mirror 15B along the optical path. Such a modification also allows the same measurement as described above with reference to FIG. 3 to be made.

The present invention is not limited to the details of the above described preferred embodiment. The scope of the invention is defined by the appended claim and all changes and modifications as fall within the equivalence of the scope of the claim are therefore to be embraced by the invention.

What is claimed is:

1. A pulse duration measuring apparatus having a plurality of optical parts for measuring pulse duration of a pulsed laser beam, comprising:
   a laser beam entry element for receiving a pulsed laser beam;
   a polarizing beam splitter for splitting the pulsed laser beam from the laser beam entry element into a first laser beam traveling along a first optical path and a second laser beam traveling along a second optical path;

a first mirror for reflecting the first laser beam traveling along the first optical path toward the polarizing beam splitter;

a second mirror for reflecting the second laser beam traveling along the second optical path toward the polarizing beam splitter;

a first quarter wavelength plate disposed between the polarizing beam splitter and the first mirror;

a second quarter wavelength plate disposed between the polarizing beam splitter and the second mirror;

an optical path length changing unit for moving the first mirror or the second mirror along the optical path of the first laser beam or the second laser beam to change a length of the optical path;

a nonlinear crystal body for allowing a combined laser beam to pass therethrough, the combined laser beam including respective returning laser beams of the first and second laser beams reflected respectively by the first and second mirrors and combined by the polarizing beam splitter; and a photodetector for measuring an optical intensity of the combined laser beam that has passed through the nonlinear crystal body, wherein the laser beam entry element, the polarizing beam splitter, the first mirror, the second mirror, the first quarter wavelength plate, the second quarter wavelength plate, the optical path length changing unit, the nonlinear crystal body, and the photodetector are disposed on a planar surface.

* * * * *